United States Patent [19]

Barham

[11] Patent Number: 4,803,797
[45] Date of Patent: Feb. 14, 1989

[54] COMPACT FISHING DEVICE

[76] Inventor: Reginald D. Barham, 12317 Almeda Rd., Houston, Tex. 77045

[21] Appl. No.: 69,014

[22] Filed: Jul. 1, 1987

[51] Int. Cl.⁴ .............................................. A01K 87/00
[52] U.S. Cl. ..................................................... 43/18.1
[58] Field of Search ............................. 43/18.1, 19, 4

[56] References Cited

U.S. PATENT DOCUMENTS

| | | | |
|---|---|---|---|
| 3,302,320 | 2/1967 | Breeden | 43/18.1 |
| 3,641,695 | 2/1972 | Zenick | 43/19 |
| 4,048,743 | 9/1977 | Lapinski | 43/18.1 |
| 4,082,235 | 4/1978 | Dauvergne | 43/18.1 |
| 4,221,067 | 9/1980 | Thorvaldsen | 43/18.1 |
| 4,301,611 | 11/1981 | Lapinski | 43/18.1 |

Primary Examiner—Gene P. Crosby
Attorney, Agent, or Firm—Pravel, Gambrell, Hewitt, Kimball & Krieger

[57] ABSTRACT

A method and apparatus is disclosed for fishing. The apparatus is adapted for use with a fishing line and includes a one-piece compact floatable fishing device forming a first longitudinal axis. The fishing device has a fixed spool coaxially aligned with the first longitudinal axis of the fishing device. A handle is disposed at the first end of the fishing device and the spool is disposed adjacent the handle to operably allow releasing and locking of the fishing line on the spool. The fishing device is independent of moving parts. The fishing device is adapted for use with a tube having an inner surface and a blocking shoulder corresponding with the outer surface and blocking shoulder of the second end of the fishing device to provide unattended use of the fishing device. A method for fishing comprises the above apparatus which allows right-hand use or, alternatively, left-hand use of the fishing device.

14 Claims, 1 Drawing Sheet

COMPACT FISHING DEVICE

BACKGROUND OF THE INVENTION

1. Field of the Invention

This invention relastes generally to a method and apparatus for fishing and, more particularly, to a compact one-piece fishing device independent of moving parts.

2. Description of the Prior Art

There are many fishing devices in common use having an elongated two-piece rod and a rotatable fishing reel secred thereon.

A problem with some of these devices is that they comprise a number of parts, some of them moving, which increases the cost of manufacture and maintenance of the device.

Additionally, the moving parts on the prior devices present operation and maintenance concerns in the care and use of the prior art fishing devices. Also, some of these prior art fishing devices are fabricated from materials which would cause the device to sink if it were inadvertently dropped in the water.

The above fishing devices are undesirable in that they do not provide a compact fishing device independent of moving parts. Additionally, the above fishing devices are undesirable because they would not float on the surface of the water if they were inadvertently dropped.

3. Identification of Objects of the Invention

An object of the invention is to provide an improved fishing device adapted for use with a fishing line.

It is another object of this invention to provide a compact, one-piece fishing device independent of moving parts.

It is another object of this invention to provide a method for fishing with the aforesaid device.

It is a further object of the invention to provide a fishing device which is economical to manufacture, durable in use and efficient in operation.

SUMMARY OF THE INVENTION

In accordance with the invention, a method and apparatus is disclosed for fishing. The apparatus is adapted for use with a fishing line and includes a one-piece compact floatable fishing device forming a first longitudinal axis. The fishing device has a fixed spool coaxially aligned with the first longitudinal axis of the fishing device. A handle is disposed at the first end of the fishing device. The spool is disposed adjacent the handle to operably allow releasing and locking of the fishing line on the spool even though the fishing device is independent of moving parts.

In accordance with the invention, the fishing device is adapted for use with a tube having an inner surface and a blocking shoulder corresponding with the outer surface and blocking shoulder of the second end of the fishing device to operably provide unattended use of the fishing device.

In further accordance with the invention, a method for fishing comprises the above apparatus which allows right-hand use or, alternatively, left-hand use of the fishing device.

BRIEF DESCRIPTION OF THE DRAWINGS

The objects, advantages and features of the invention will become more apparent by reference to the drawings which are appended hereto and herein like numerals indicate like parts and wherein an illustrated embodiment of the invention is shown, of which.

DESCRIPTION OF THE PREFERRED EMBODIMENT

The fishing device of the present invention, indicated generally at 10 in FIGS. 1-4, is adapted for use with a fishing line 12 that is shown in broken view in FIGS. 1-4. The fishing device 10 includes a handle 14, a fixed spool 16 and a butt or first member 18. The fishing device 10 is preferably a one-piece structure fabricated from plastic. Additionally, the fishing device is preferably hollow so as to allow it to float on the water surface if inadvertently dropped therein. Though the present invention is shown as a one-piece hollow structure fabricated from plastic, other types of fabrication material and means for assembly are included in its intended structure and fabrication.

Figure 2:
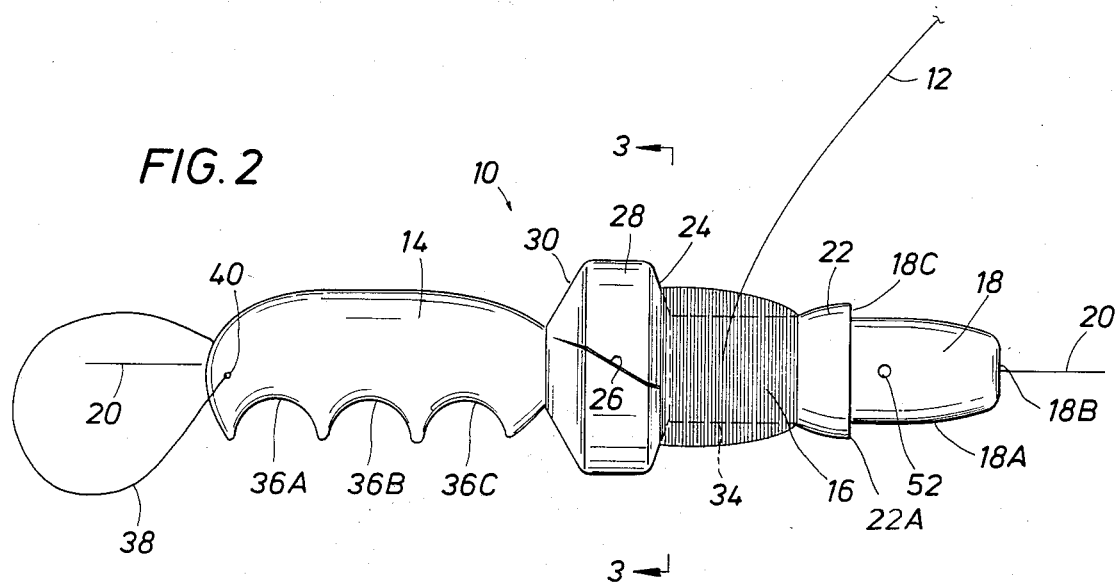
FIG. 2 is an enlarged side elevational view of the fishing device of the invention.

Referring now to the side elevational view of FIG. 2, the fishing device 10 forms a first longitudinal axis 20. A fixed spool 16 is coaxially aligned with the first longitudinal axis 20 of the fishing device 10. Handle 14 is disposed at the first end of the fishing device and a butt 18 is disposed at the second end of the fishing device 10. The spool 16 is disposed adjacent to the handle 14 to operably allow releasing or locking of the fishing line 12 on the spool, as will be explained in detail below.

The spool 16 comprises a first frustoconical surface 22 at one end of the spool to operably aid in releasing and locking the fishing line. A second frustoconical surface 24 is positioned at the other end of the spool to operably aid in holding the fishing line on the spool 16. The second furstoconical surface 24 includes a slit 26 for preventing the fishing line from unwinding. Slit 26 is cut into the cylindrical member 28 and the frustoconical surfaces 24 and 30, as best shown in FIG. 2. The fishing line 12 is secured or locked within the slit 26 during nonuse of the device.

Figure 3:
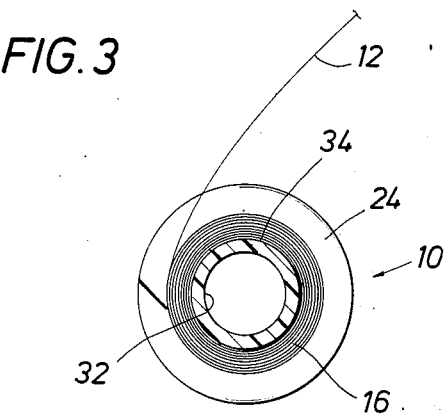
FIG. 3 is a section view taken along lines 3—3 of FIG. 2.

As discussed above, the preferred embodiment of the invention is fabricated from plastic and is hollow, as best shown in FIG. 3, to aid in the flotation of the device if it were inadvertently dropped into the water. A gauge and type of plastic is used to prevent bending or cracking of the device during its use. The spool 16, best shown in FIG. 3, has an inner surface 32 and an outer surface 34. The fishing line 12 is wound about the outer surface 34 and between the frustoconical surfaces 22 and 24.

Preferably to initiate the winding of the line 12 on the spool 16, a groove (not shown) is provided in the spool 16 whereon the line 12 is tied together so as to prevent inadvertent separation of the line 12 from the fishing device 10.

The handle 14 is provided with three finger grooves 36A, 36B and 36C to receive either a right hand or left hand. The fishing device 10 is symmetrical about a plane along the longitudinal axis 20 to allow use by a right-hander or left-hander.

Additionally, the handle 14 may include a strap 38 received through a bore 40 in a solid portion of the handle. The strap is worn about the wrist of the fisherman to prevent inadvertent release of the fishing device during use or to hand from a peg when the device is stored.

Figure 4:
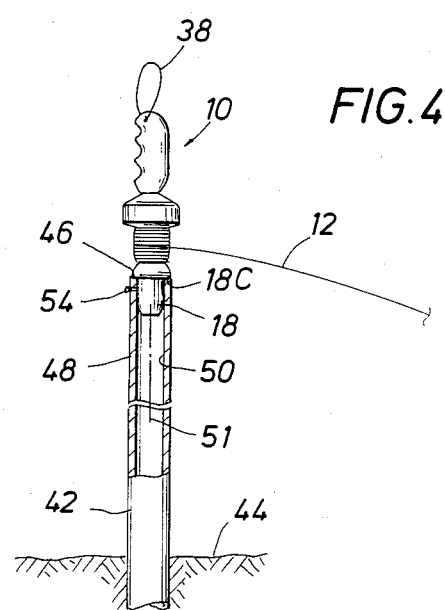
FIG. 4 is a side elevational view of the invention positioned within a tubular member with the tubular member shown in sectional view for illustration purposes.

Turning now to FIG. 4, the fishing device 10 advantageously allows the first member or butt 18 to be received in a tube or receiving member 42 fixed in the ground 44. The receiving member 42 is preferably a tube though other cross-sectional shapes, such as square or triangular could be used. The butt 18 of the device 10 would be fabricated to correspond to the cross-sectional shape of the desired receiving member 42. Of course, if the cross-sectional shape is other than circular or tube-shaped, rotation of the fishing device 10 would be prevented when the corresponding butt of the fishing device was positioned into the receiving member 42.

The preferred embodiment shows tubular member 42 having a blocking shoulder 46 at its upper end 48 and an inner surface 50. The butt 18 is preferably coaxially aligned with the longitudinal axis 20 and longitudinal axis 20 is preferably aligned with the axis 51 of the receiving member 42. Butt 18 has an outer surface 18A generally cylindrical and curves inwardly to a butt end 18B to aid in the positioning of the device 10 in the receiving member 42.

The outer surface 18A of the butt 18 has a smaller diameter than the edge 22A of frustoconical surface 22 to define a blocking shoulder 18C. Blocking shoulder 18C operably engages with the blocking shoulder 46 of the receiving member 42 to aid in holding the fishing device 10 within the receiving member 42. The use of preferred tubular member 42 and generally cylindrical butt 18 would allow automatic rotation of the fishing device 10 in releasing or unwinding fishing line 12. An aperture 52 may be provided in the butt 18 and an aligned hole 53 in the receiving member 42 to receive a pin 54 to prevent rotation, if desired. Aperture 52 and bore 40 in the device would be fabricated so as prevent fluid from being received into the hollow fishing device thereby maintaining its floatable characteristics. The fishing device could be fabricated from plastic in a number of different colors.

USE AND OPERATION

In the use and operation of the fishing device 10, the device would include a fishing line 12 wound about the spool 16 in either a clockwise manner for right hand fishermen or counterclockwise for left hand fishermen. This rotation of the fishing line on the device is to allow proper releasing and locking by use of the fisherman's index finger. After the fishing line is properly wound around the spool, enough fishing line is provided to allow the fisherman to sling one end of the line containing weight 56, leader 58, hook 60, and bait. The index finger is removed to allow the line 12 to travel in the direction of the cast. The longitudinal axis 20 of the fishing device 10 is preferably aligned in this direction of travel of the fishing line 12 during the cast.

Figure 1:
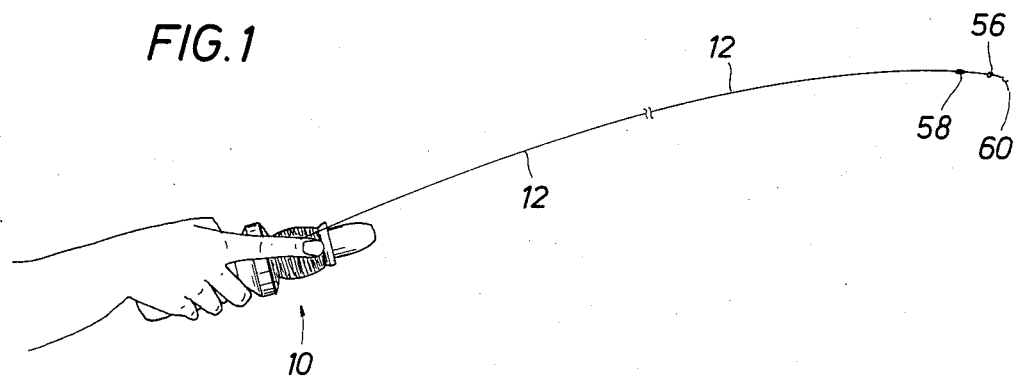
FIG. 1 is a perspective view of the fishing device of the invention illustrating the casting of the fishing line.

To stop or lock the line 12, the fisherman would place his finger across the spool and on frustoconical surface 22 thereby preventing further unwinding of the line 12, as best shown in FIG. 1. To set the hook the fisherman would grasp the handle 14 in one hand and the butt 18 in the other hand to provide full control while pulling in or jerking the fishing device. To allow the fisherman to operate a single or a number of the fishing devices unattended, the use of a receiving member 42 may be used, as discussed previously.

Various modifications and alterations in the disclosed apparatus and methods will be apparent to those skilled in the art of the foregoing description which does not depart from the spirit of the invention. For this reason, these changes are desired to be included in the appended claims. The appended claims recite only the limitation to the present invention in the descriptive manner which is employed for setting forth the embodiments and is to be interpreted as illustrative and not limitative.

What is claimed:

1. Apparatus adapted for use with a fishing line comprising:
    a fishing device forming a first longitudinal axis and having a first end and a second end, said fishing device having a fixed spool aligned with the first longitudinal axis of the fishing device,
    a first frustroconical surface positioned between said second end and said fixed spool to operably aid in releasing the fishing line,
    a handle disposed at said first end, said spool disposed adjacent said handle to operably allow releasing or locking of the fishing line on said spool; and
    a first member means extending coaxially outwardly from said fixed spool with means for providing unattended support of the fishing device.

2. Apparatus of claim 1 adapted for use with a receiving member forming a second longitudinal axis and having an inner surface and a blocking shoulder, said apparatus further comprising:
    said first member means coaxially aligned with said first longitudinal axis and positioned at said second end,
    an outer surface of said first member means having a blocking shoulder,
    means for positioning said first member means in the receiving member to operably engage said first member means blocking shoulder with the receiving member blocking shoulder for unattended use of the fishing device.

3. Apparatus of claim 1 wherein said spool further comprises:
    a second frustoconical surface positioned at an other end of said spool to operably aid in holding the fishing line on said spool.

4. Apparatus of claim 3 wherein said second frustoconical surface comprises:
    means for preventing said fishing line from unwinding.

5. Apparatus of claim 1 wherein said fishing device is fabricated from plastic.

6. Apparatus of claim 1 wherein said fishing device is floatable.

7. Apparatus of claim 1 wherein said fishing device is a one-piece structure independent of moving parts.

8. Apparatus of claim 1 wherein said fishing device is sufficiently symmetrical about the first longitudinal axis to operably allow right hand or left hand use of the device.

9. Apparatus of claim 1 wherein said fishing device is compact.

10. Apparatus adapted for use with a fishing line comprising:
    a fishing device forming a first longitudinal axis and having a first end and a second end, said fishing device having a fixed spool aligned with the first longitudinal axis of the fishing device, a handle disposed at said first end, said spool disposed adjacent said handle to operably allow releasing or locking of the fishing line on said spool, and a first member means extending substantially coaxially outwardly from and being monolithic with said fixed spool at said second end with means for grasping said apparatus while operating the fishing device.

11. Apparatus of claim 10 adapted for use with a receiving member forming a second longitudinal axis and having an inner surface and a blocking shoulder, said apparatus further comprising:

said first member means coaxially aligned with said first longitudinal axis and positioned at said second end, an outer surface of said first member means having a blocking shoulder, means for positioning said first member means in the receiving member to operably engage said first member means blocking shoulder with the receiving member blocking shoulder for unattended use of the fishing device.

12. Apparatus of claim 10 wherein said spool further comprises:

a first frustroconical surface positioned at one end of said spool to operably aid in releasing the fishing line.

13. Apparatus adapted for use with a line, comprising a body forming a first longitudinal axis and having a first end and a second end, said body having a fixed spool aligned with the first longitudinal axis of the body, a handle disposed at said first end, said spool disposed adjacent to said handle to operably allow release of the line on said spool, a first member extending coaxially outwardly from and being monolithic with said fixed spool at said second end, and means disposed between said spool and said first member for reducing friction between said line and said body.

14. Apparatus of claim 13 being a one-piece compact floatable fishing device independent of moving parts.

* * * * *